United States Patent
Miyaji et al.

(10) Patent No.: US 12,042,799 B2
(45) Date of Patent: Jul. 23, 2024

(54) MONITORING SYSTEM FOR MILLING FACILITY

(71) Applicant: SATAKE CORPORATION, Tokyo (JP)

(72) Inventors: Makoto Miyaji, Tokyo (JP); Yoshihiro Tokui, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 412 days.

(21) Appl. No.: 17/600,958

(22) PCT Filed: Feb. 28, 2020

(86) PCT No.: PCT/JP2020/008389
§ 371 (c)(1),
(2) Date: Oct. 1, 2021

(87) PCT Pub. No.: WO2020/202956
PCT Pub. Date: Oct. 8, 2020

(65) Prior Publication Data
US 2022/0176382 A1  Jun. 9, 2022

(30) Foreign Application Priority Data
Apr. 4, 2019  (JP) ................. 2019-072271

(51) Int. Cl.
*B02C 9/04* (2006.01)
*B02C 4/06* (2006.01)
(Continued)

(52) U.S. Cl.
CPC ........... *B02C 9/04* (2013.01); *B02C 4/06* (2013.01); *B02C 23/08* (2013.01); *B02C 25/00* (2013.01);
(Continued)

(58) Field of Classification Search
CPC .. B02C 9/04; B02C 4/06; B02C 23/08; B02C 25/00; G01F 1/28; G01F 1/44; G01F 9/00; B23K 9/323; B23K 11/3054
(Continued)

(56) References Cited

U.S. PATENT DOCUMENTS 9,067,210 B2 *   6/2015  Dubat ................... G01N 15/02
2013/0092269 A1 *  4/2013  Nakada ............... G05D 7/0635
                                                                 137/613
(Continued)

FOREIGN PATENT DOCUMENTS

BR   102014005562 A2 *  2/2015  ........... A23L 1/1025
CA       2357149 A1 *  3/2002  ............... B02B 5/02
(Continued)

OTHER PUBLICATIONS

Yasuguchi, Masayuki Instrumentation for Pulverulant and Granular Material at Flour Mill, Journal of the Research Association of Powder Technology, (https://www.jstage.jst.go.jp/article/sptj1964/14/4/14_4_221/_article), Japan 1977, vol. 4 (Year: 1977).*
(Continued)

*Primary Examiner* — Stephanie E Bloss
*Assistant Examiner* — Kevin C Butler
(74) *Attorney, Agent, or Firm* — Faegre Drinker Biddle Reath LLP

(57) ABSTRACT

Provided is a monitoring system for a milling facility, which includes a plurality of grinders including roll mills for grinding a material to be milled and sifting machines for sifting, according to grain size, the material to be milled as ground by the roll mills; and a plurality of pulverizers including roll mills for pulverizing the material to be milled and sifting machines for sifting, according to grain size, the material to be milled as pulverized by the roll mills. The material to be milled is milled by each of the grinders and
(Continued)

pulverizers. A plurality of flow rate measuring devices are provided on respective flow paths for product flours discharged from the respective sifting machines in the respective grinders and pulverizers, and a monitoring device capable of monitoring presence or absence of an abnormality based on measurement results on respective flow rates of the product flours is provided.

7 Claims, 2 Drawing Sheets

(51) Int. Cl.
  *B02C 23/08* (2006.01)
  *B02C 25/00* (2006.01)
  *B23K 9/32* (2006.01)
  *B23K 11/30* (2006.01)
  *G01F 1/28* (2006.01)
  *G01F 1/44* (2006.01)
  *G01F 9/00* (2006.01)

(52) U.S. Cl.
  CPC .......... *B23K 9/323* (2013.01); *B23K 11/3054* (2013.01); *G01F 1/28* (2013.01); *G01F 1/44* (2013.01); *G01F 9/00* (2013.01)

(58) Field of Classification Search
  USPC .......................................................... 73/196
  See application file for complete search history.

(56) References Cited

U.S. PATENT DOCUMENTS

| | | | | |
|---|---|---|---|---|
| 2015/0260266 A1 * | 9/2015 | Bassinello | .............. | B02B 3/045 474/70 |
| 2020/0025604 A1 * | 1/2020 | Uebayashi | ........... | G01G 13/247 |
| 2020/0191694 A1 * | 6/2020 | Tracy | .................. | G01N 15/0205 |
| 2022/0176382 A1 * | 6/2022 | Miyaji | .................... | B02C 23/08 |

FOREIGN PATENT DOCUMENTS

| | | | | | |
|---|---|---|---|---|---|
| CA | 2357149 | C | * | 4/2007 | .............. B02B 5/02 |
| CN | 1144718 | A | * | 3/1997 | |
| CN | 1185940 | C | * | 1/2000 | .............. B02C 4/06 |
| CN | 1409969 | A | * | 4/2003 | .............. B02C 4/06 |
| CN | 1962068 | A | * | 5/2007 | |
| CN | 102049327 | A | * | 5/2011 | |
| CN | 102105228 | A | * | 6/2011 | .............. B02C 25/00 |
| CN | 103894260 | A | * | 7/2014 | .............. B02C 9/04 |
| CN | 204911591 | U | * | 12/2015 | |
| EP | 218012 | A | * | 4/1987 | .............. B02B 3/04 |
| GB | 2103373 | A | * | 2/1983 | .............. B01D 45/14 |
| JP | H03-178348 | A | | 8/1991 | |
| JP | H03178348 | A | * | 8/1991 | .............. B02C 4/38 |
| JP | H09-038519 | A | | 2/1997 | |
| JP | 3511421 | B2 | * | 3/2004 | |
| JP | 2007326005 | A | * | 12/2007 | |
| JP | 2013-006163 | A | | 1/2013 | |
| JP | 2013006163 | A | * | 1/2013 | |
| JP | 5433660 | B2 | * | 3/2014 | .............. G01F 1/00 |
| JP | 2017-087179 | A | | 5/2017 | |
| JP | 2017087179 | A | * | 5/2017 | |
| JP | 2018-151383 | A | | 9/2018 | |
| JP | 2018151383 | A | * | 9/2018 | .............. G01F 1/05 |
| JP | 2019072271 | A | * | 5/2019 | |
| JP | 6592918 | B2 | * | 10/2019 | .............. B02B 5/02 |
| JP | 6812098 | B2 | * | 1/2021 | |
| KR | 102608262 | B1 | * | 11/2023 | |
| WO | WO-2011061420 | A1 | * | 5/2011 | .............. B02C 4/06 |
| WO | WO-2018164064 | A1 | * | 9/2018 | .............. G01F 1/05 |
| WO | WO-2020202956 | A1 | * | 10/2020 | .............. B02C 11/00 |

OTHER PUBLICATIONS

Aleksandar Z. Fišteš et al., Comparative analysis of milling results on the tail-end reduction passages of the wheat flour milling process: Conventional vs. eight-roller milling system, Hem. ind. 69 (4) 395-403 (2015) (Year: 2015).*

Aleksandar Fistes et al., Using the eight-roller mill on the front passages of the reduction system, Journal of Food Engineering, 85 (2008) 296-302 (Year: 2008).*

S. Guillaume, Characterization of Mill Products by Analysis of In-flow Digitalized Images, Journal of Food Engineering 27 (1996) 311-32 (Year: 1996).*

Diogo Martins et al., An axiomatic approach to a cork granulation facility design, MATEC Web of Conferences 223, 01020 (2018) (Year: 2018).*

G. M. Campbell et al., On Predicting Roller Milling Performance VI Effect of Kernel Hardness and Shape on the Particle Size Distribution from First Break Milling of Wheat, Trans IChemE, Part C, Food and Bioproducts Processing, 2007, 8 vol. 85 (C1) 7-23 (Year: 2007).*

Suzanne Smyth et al., Lessons learned from a milling explosion, Journal of Loss Prevention in the Process Industries, vol. 62, Nov. 2019, 103928, p. 6 (Year: 2019).*

Written Opinion International Searching Authority, PCT/JP2020/008389, Feb. 28, 2020, p. 4 (Year: 2020).*

International Search Report (ISA), PCT/JP2020/008389, May 20, 2020, p. 3 (Year: 2020).*

Korean Office Action issued Jan. 30, 2024 in Application No. 10-2021-7035168.

Yasuguchi, "Instrumentation for Pulverulant and Granular Material at Flour Mill, Flow Measurement and the Calculation of the Extraction," Journal of the Research Association of Powder Technology, vol. 14, No. 4, pp. 29-35, 1977.

"Komugiko no hanashi" (Stories about wheat flour), Zaidan Houjin Seifunshikoukai (Incorporated Foundation Flour Milling Promotion Association), Jun. 30, 1989, pp. 47-55.

* cited by examiner

MONITORING SYSTEM FOR MILLING FACILITY

CROSS REFERENCE TO RELATED APPLICATIONS

This application is a National Stage of International Application No. PCT/JP2020/008389, filed Feb. 28, 2020, and claims the benefit of Japanese Patent Application No. 2019-072271 filed Apr. 4, 2019, the entire contents of each of which are incorporated herein by reference.

TECHNICAL FIELD

The present invention relates to a milling facility for milling crops such as wheat or another material to be milled, and more particularly relates to a monitoring system for a milling facility capable of monitoring the presence or absence of an abnormality in the milling facility.

BACKGROUND ART

As a method of milling wheat, the gradual milling system is known in which wheat grains are reduced little by little to gradually produce wheat flour.

CITATION LIST

Non Patent Literature

[Non Patent Literature 1] Non-patent literature "*Komugiko no hanashi*" (Stories about wheat flour), Zaidan Houjin Seifunshinkoukai (Incorporated Foundation Flour Milling Promotion Association), Jun. 30, 1989, pp. 47-55

FIG. 3 is a flow chart of a milling process described in the above Non Patent Literature. More specifically, FIG. 3 shows a flow chart of the process of milling wheat through three operations of a grinding step, a purifying step and a pulverizing step.

Wheat is first selected carefully by various separators, and then conditioned using a dampener and a tempering tank or the like. The carefully selected and conditioned wheat is ground in the grinding step by a brake roll such that wheat grains enlarge, and then sifted out by a sifter. Part of the sifted-out wheat is divided as a product flour (break flour), while hulls (unground pieces) with endosperms left are sent back to the grinding step, and endosperm coarse grains (that is, endosperms (coarse grain pieces) shown in FIG. 3) which are other intermediate products are sent to the purifying step.

The endosperm coarse grains sent to the purifying step are separated from hull pieces by a purifier to be sent to the pulverizing step as high-purity endosperm coarse grains.

The endosperm coarse grains sent to the pulverizing step are pulverized finely by a smooth roll, and then sifted out by a sifter. Part of the sifted-out endosperm coarse grains are divided as a product flour (middlings). In contrast, endosperm coarse grains not sufficiently pulverized (that is, unpulverized portions) are sent back to the pulverizing step to be repeatedly subjected to pulverization and sifting.

Intermediate products having passed through the brake rolls and the smooth rolls are always separated by the sifter according to grain size. Each time such separation is performed, some kind of product flour is divided. Ultimately, a grain of wheat is divided into many kinds of product flours.

Then, these product flours are variously different from each other in hue, ash content, protein content, quality of gluten, and the like. The various product flours are combined to obtain wheat flour of a desired quality or grade. In general, by blending the respective product flours in ascending order of ash content, grouped wheat flours such as a first-class flour, a second-class flour, and a third-class flour from the top group are produced.

In the meantime, the respective grouped wheat flours are conveyed to the next step by a conveyor or the like. In this conveyance, a conventional milling facility confirms the presence or absence of an abnormality in the facility based on yields obtained by measuring the weights of the respective wheat flours conveyed with the conveyor or the like.

However, in an actual milling facility, the grinding step and the pulverizing step are configured by a combination of a plurality of tiers of roll mills and sifting machines. Thus, a roll mill or a sifting machine having an abnormality cannot be specifically identified. As a result, a problem occurs that an abnormal spot in the milling facility has to be found back through the respective steps based on experiences of an operator.

SUMMARY OF INVENTION

Problem to be Solved by the Invention

Therefore, an object of the present invention is to provide a monitoring system for a milling facility that is capable of monitoring the presence or absence of an abnormality, and in a case where an abnormality is present, enables an operator to easily find out an abnormal spot.

Means for Solving the Problem

In order to achieve the above-described object, the present invention is a monitoring system for a milling facility including:

a plurality of grinders configured by combining roll mills (brake rolls) for grinding a material to be milled and sifting machines (sifters) for sifting out, according to grain size, the material to be milled as ground by the roll mills (brake rolls); and a plurality of pulverizers configured by combining roll mills (smooth rolls) for pulverizing the material to be milled and sifting machines (sifters) for sifting out, according to grain size, the material to be milled as pulverized by the roll mills (smooth rolls), and the material to be milled which is a raw material is gradually milled by each of the grinders and each of the pulverizers.

The monitoring system includes: a plurality of flow rate measuring devices provided on respective flow paths for product flours discharged from the respective sifting machines in the respective grinders and the respective pulverizers; and a monitoring device capable of monitoring presence or absence of an abnormality.

The monitoring device is capable of monitoring the presence or absence of an abnormality based on measurement results on respective flow rates of the product flours obtained by the respective flow rate measuring devices.

Preferably, in the present invention, the monitoring device has a display configured to display the measurement results of respective flow rates of the product flours obtained by the respective flow rate measuring devices, and the presence or absence of an abnormality can be monitored based on the measurement results of the respective flow rates of the product flours displayed on the display.

Preferably, in the present invention, the monitoring device has a comparison determiner configured to respectively compare measurement values of the respective flow rates of the product flours obtained by the respective flow rate measuring devices with a reference value set in advance, and to determine the presence or absence of an abnormality, and the presence or absence of an abnormality can be monitored based on a determination result obtained by the comparison determiner.

Preferably, in the present invention, the monitoring device has a comparison determiner configured to respectively compare measurement values of the respective flow rates of the product flours obtained by the respective flow rate measuring devices in a time-series manner, and to determine the presence or absence of an abnormality, and the presence or absence of an abnormality can be monitored based on a determination result obtained by the comparison determiner.

Alternatively, in order to achieve the above-described object, the present invention is a monitoring system for a milling facility including:

a plurality of grinders configured by combining roll mills (brake rolls) for grinding a material to be milled and sifting machines (sifters) for sifting out, according to grain size, the material to be milled as ground by the roll mills (brake rolls); and a plurality of pulverizers configured by combining roll mills (smooth rolls) for pulverizing the material to be milled and sifting machines (sifters) for sifting out, according to grain size, the material to be milled as pulverized by the roll mills (smooth rolls), and the material to be milled which is a raw material is gradually milled by each of the grinders and each of the pulverizers.

The monitoring system includes: a plurality of flow rate measuring devices provided on respective flow paths for materials to be milled as discharged according to grain size from the respective sifting machines in the respective grinders and the respective pulverizers; and a monitoring device capable of monitoring presence or absence of an abnormality.

The monitoring device is capable of monitoring the presence or absence of an abnormality based on measurement results on respective flow rates of the respective materials to be milled as obtained by the respective flow rate measuring devices.

Effects of the Invention

The monitoring system for a milling facility according to the present invention enables monitoring of the presence or absence of an abnormality in each of the flow paths for product flours discharged from the respective grinders, the respective pulverizers, or the respective sifting machines, and in a case where an abnormality is present, enables an operator to easily find out an abnormal spot.

Moreover, the monitoring system for a milling facility according to the present invention enables an occurrence of an abnormality to be dealt with as appropriate, and further enables wheat flours to be stabilized in quality.

Moreover, the monitoring system for a milling facility according to the present invention enables monitoring of the presence or absence of an abnormality in each of the flow paths of the material to be milled as discharged from each of the grinders, each of the pulverizers, or each of the sifting machines according to grain size, and in a case where an abnormality is present, enables an operator to easily and detailedly find out an abnormal spot.

Additionally, a preferable embodiment of the monitoring system for a milling facility according to the present invention enables the flow rates in the respective flow paths for product flours discharged from the respective sifting machines to be visualized on the display, and in a case where an abnormality is present, enables an operator to easily find out an abnormal spot.

Moreover, some preferable embodiments of the monitoring system for a milling facility according to the present invention enable detection of an abnormality to be automated.

BRIEF DESCRIPTION OF DRAWINGS

The objects and characteristics of the present invention will be more apparent considering detailed description with reference to the following appended drawings.

DESCRIPTION OF EMBODIMENTS

Next, embodiments of a monitoring system for a milling facility according to the present invention will be described in detail with reference to the appended drawings.

Figure 1:
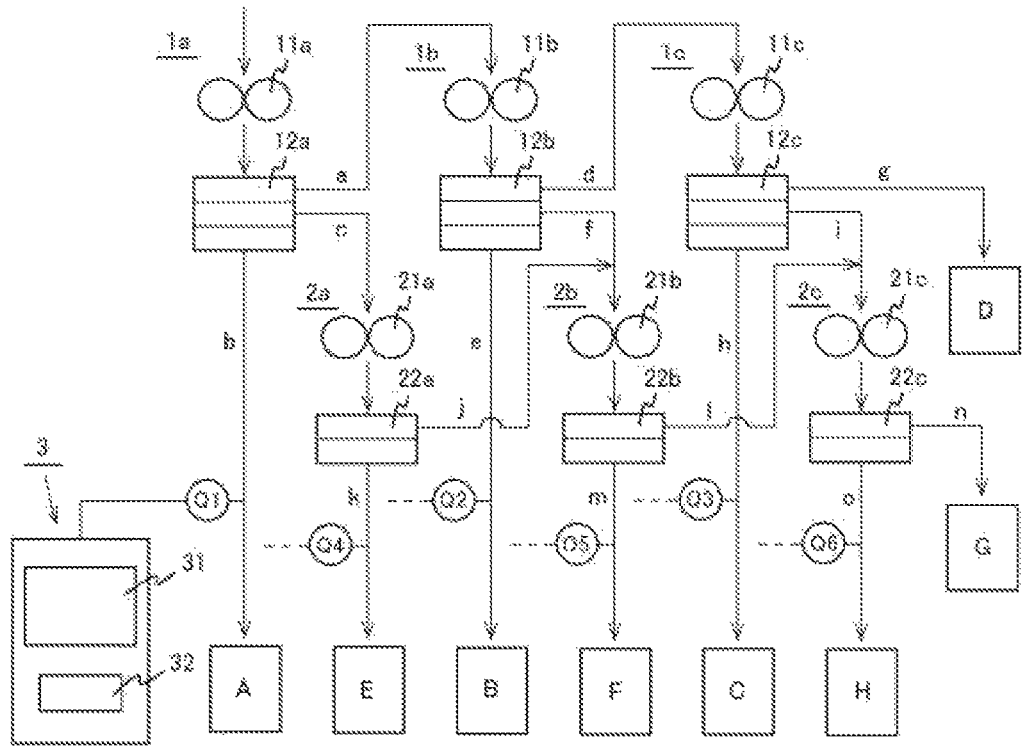
FIG. 1 is a schematic explanatory diagram of an embodiment of a milling facility for use in a monitoring system according to the present invention.

FIG. 1 shows a schematic explanatory diagram of an embodiment of a milling facility for use in the monitoring system according to the present invention.

The milling facility shown in FIG. 1 includes three grinders 1a to 1c, and three pulverizers 2a to 2c arranged downstream of the respective grinders 1a to 1c.

The respective grinders 1a to 1c respectively include roll mills 11a to 11c, each of which grinds wheat. The respective grinders 1a to 1c further include respective sifting machines 12a to 12c, which are provided at the immediate next stage of the respective roll mills 11a to 11c, to sift out, according to grain size, wheat ground in these mills 11a to 11c. In other words, the respective grinders 1a to 1c are configured by combining the respective roll mills 11a to 11c and the sifting machines 12a to 12c.

The respective pulverizers 2a to 2c include roll mills 21a to 21c that are arranged downstream of the respective grinders 1a to 1c, and each pulverize wheat. The respective pulverizers 2a to 2c further include respective sifting machines 22a to 22c, which are provided at the immediate next stage of the respective roll mills 21a to 21c, to sift out wheat pulverized in these mills 21a to 21c according to grain size. In other words, the respective pulverizers 2a to 2c are configured by combining the respective roll mills 21a to 21c and the sifting machines 22a to 22c.

The respective grinders 1a to 1c include brake rolls as the respective roll mills 11a to 11c. The respective sifting machines 12a to 12c are provided at the immediate next stage of the respective brake rolls. These sifting machines 12a to 12c include two-tier sieves having different meshes.

Moreover, the respective pulverizers 2a to 2c include smooth rolls as the respective roll mills 21a to 21c. The respective sifting machines 22a to 22c are provided at the immediate next stage of the respective smooth rolls. These sifting machines 22a to 22c include single-tier sieves.

In the milling facility shown in FIG. 1, the carefully selected and conditioned wheat is fed into the first brake roll 11a in the first grinder 1a to be ground. The ground wheat is sifted out by the first sifting machine 12a provided at the immediate next stage of the first brake roll 11a, and then classified into three types according to grain size.

Among them, wheat having a large grain size is conveyed through a flow path a. The wheat conveyed through the flow path a is fed into the second brake roll 11b in the second grinder 1b to be ground further. Wheat having a small grain size is conveyed through a flow path b, and taken out as a product flour A. Wheat having an intermediate grain size is conveyed through a flow path c, and then fed into the first smooth roll 21a in the first pulverizer 2a to be pulverized.

The wheat fed into and ground by the second brake roll 11b in the second grinder 1b is sifted out by the second sifting machine 12b provided at the immediate next stage of the second brake roll 11b. As a result of sifting by the second sifting machine 12b, the ground wheat is classified into three types according to grain size.

Among them, wheat having a large grain size is conveyed through a flow path d. The wheat conveyed through the flow path d is fed into the third brake roll 11c in the third grinder 1c to be ground further. Wheat having a small grain size is conveyed through a flow path e, and taken out as a product flour B. Wheat having an intermediate grain size is conveyed through a flow path f, and then fed into the second smooth roll 21b in the second pulverizer 2b to be pulverized.

The wheat fed into and ground by the third brake roll 11c in the third grinder 1c is sifted out by the third sifting machine 12c provided at the immediate next stage of the third brake roll 11c, and then classified into three types according to grain size.

Among them, wheat having a large grain size is conveyed through a flow path g, and taken out as a large bran D. Wheat having a small grain size is conveyed through a flow path h, and taken out as a product flour C. Wheat having an intermediate grain size is conveyed through a flow path i, and fed into the third smooth roll 21c in the third pulverizer 2c to be pulverized.

Next, the wheat fed into and pulverized by the first smooth roll 21a in the first pulverizer 2a is sifted out by the fourth sifting machine 22a provided at the immediate next stage of the first smooth roll 21a, and then classified into two types according to grain size.

Among them, wheat having a large grain size is conveyed through a flow path j. The wheat conveyed through the flow path j is fed into the second smooth roll 21b in the second pulverizer 2b to be pulverized further. Wheat having a small grain size is conveyed through a flow path k, and taken out as a product flour E.

The wheat fed into and pulverized by the second smooth roll 21b in the second pulverizer 2b is sifted out by the fifth sifting machine 22b provided at the immediate next stage of the second smooth roll 21b, and then classified into two types according to grain size.

Among them, wheat having a large grain size is conveyed through a flow path l. The wheat conveyed through the flow path l is fed into the third smooth roll 21c in the third pulverizer 2c to be further pulverized. Wheat having a small grain size is conveyed through a flow path m, and taken out as a product flour F.

The wheat fed into and pulverized by the third smooth roll 21c in the third pulverizer 2c is sifted out by the sixth sifting machine 22c provided at the immediate next stage of the third smooth roll 21c, and then classified into two types according to grain size.

Among them, wheat having a large grain size is conveyed through a flow path n, and taken out as a small bran G. Wheat having a small grain size is conveyed through a flow path o, and taken out as a product flour H.

Note that the wheat classified by the respective sifting machines 12a to 12c and 22a to 22c according to grain size is air-conveyed along the respective flow paths a to o configured to include pipes.

In the milling facility, raw wheat is milled into a total of six types of product flours of the product flours A, B and C obtained by the respective grinders 1a to 1c and the product flours E, F and H obtained by the respective pulverizers 2a to 2c. These milled product flours are distributed to produce wheat flours including the first-class flour, the second-class flour and the third-class flour.

Moreover, purifiers not shown may be provided between the respective grinders 1a to 1c and the respective pulverizers 2a to 2c. By purifying the wheat conveyed from the respective grinders 1a to 1c to the respective pulverizers 2a to 2c by means of the purifiers, the wheat flours can be improved in quality.

The milling facility shown in FIG. 1 further includes flow rate measuring devices (flowmeters) Q1 to Q3 provided on the respective flow paths b, e and h for the product flours discharged from the respective sifting machines 12a to 12c in the respective grinders 1a to 1c, and flow rate measuring devices (flowmeters) Q4 to Q6 provided on the respective flow paths k, m and o for the product flours discharged from the respective sifting machines 22a to 22c in the respective pulverizers 2a to 2c. The milling facility shown in FIG. 1 further includes a monitoring device 3 capable of monitoring the presence or absence of an abnormality.

The monitoring device 3 includes a display 31 configured to display measurement results of respective flow rates of the product flours obtained by the respective flow rate measuring devices Q1 to Q6.

The monitoring device 3 also includes a microcomputer, and a comparison determiner 32 configured to respectively compare the measurement values of the respective flow rates of the product flours obtained by the respective flow rate measuring devices Q1 to Q6 with a reference value input and set in advance and to determine the presence or absence of an abnormality.

Herein, if a device taught in Japanese Patent Laid-Open Publication No. 2018-151383 and so on is used in the flow rate measuring devices Q1 to Q6, the flow rates of the product flours can be measured with high accuracy. However, it is not intended to measure the flow rates using such a device in a limited manner, and the flow rates may be measured using another device.

Figure 2:
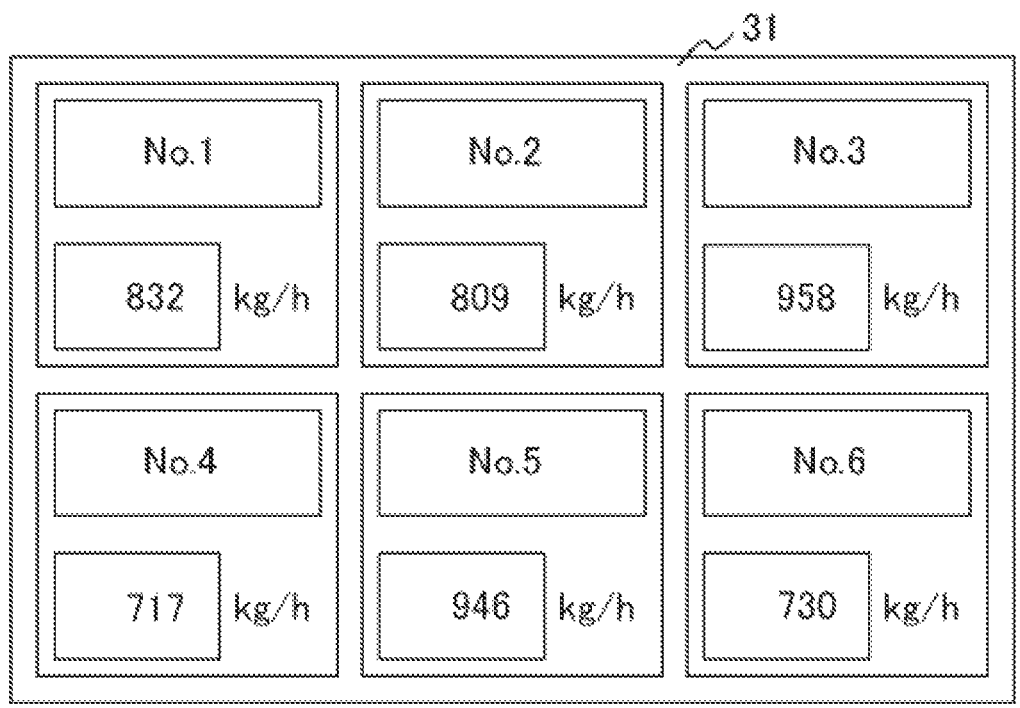
FIG. 2 is an explanatory diagram of a display in a monitoring device.
Figure 3:
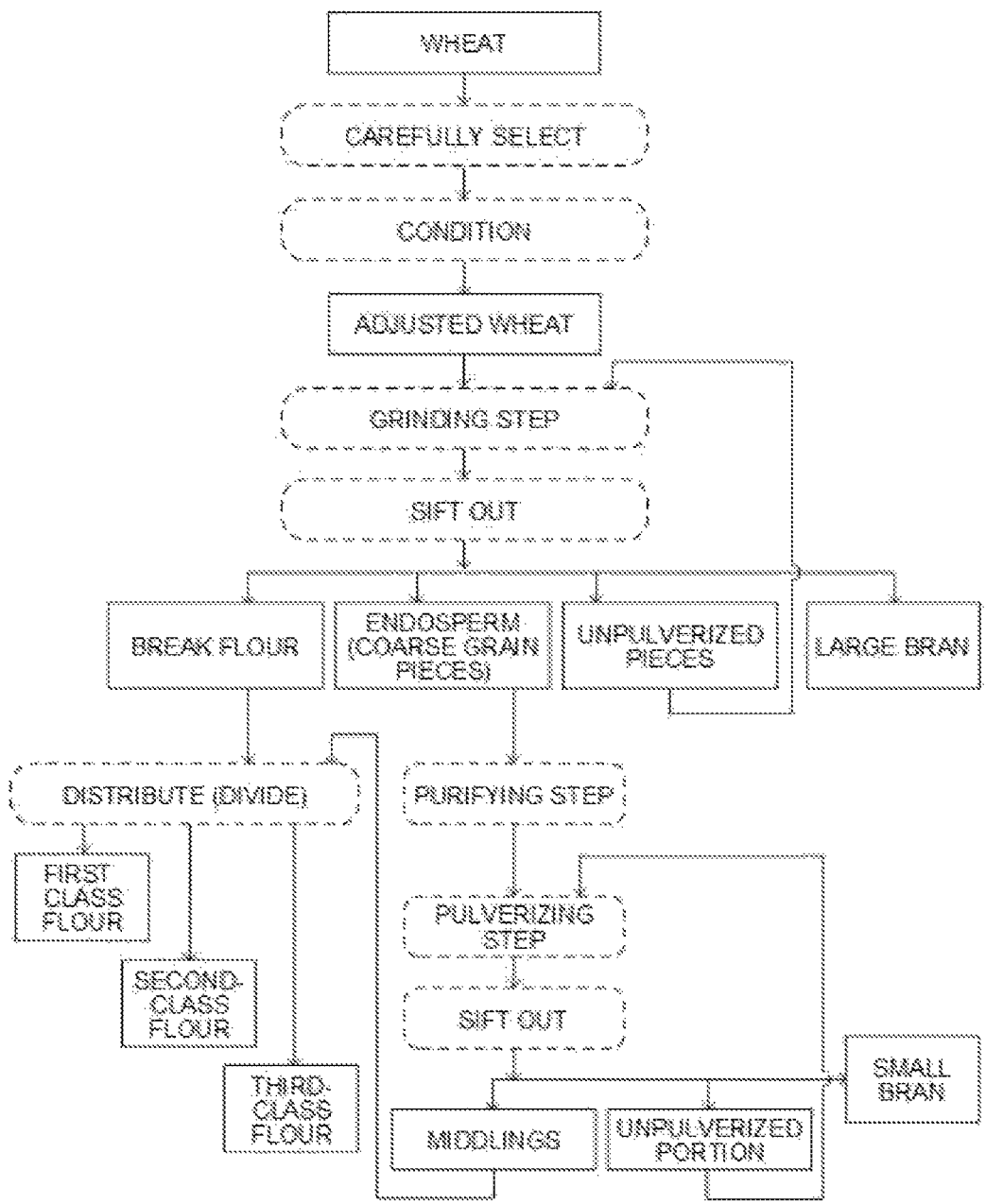
FIG. 3 is a flow chart of a milling process according to a prior art.

FIG. 2 shows an explanatory diagram of the display 31 in the monitoring device 3.

As shown in FIG. 2, measurement values (herein, weight flow rates (kg/h)) of respective flow rates of the product flours measured by the respective flow rate measuring devices Q1 to Q6 at predetermined time intervals are displayed on the display 31 in real time. On the display 31, flow rates of the product flours in the respective flow paths b, e, h, k, m and o discharged from the respective sifting machines 12a to 12c and 22a to 22c are visualized.

Herein, on the display 31 shown in FIG. 2, expressions "No. 1" to "No. 6" correspond to the flow rate measuring devices Q1 to Q6, respectively.

Then, as an example, in a case where the measurement value of the flow rate obtained by the flow rate measuring device Q1 provided on the flow path b deviates from a normal value, the deviation is presumed as being caused by a change in quality of raw wheat or the like as well as an abnormality in the roll mill 11a or the sifting machine 12a in the grinder 1a, or clogging of a pipe constituting the flow path b for the product flour discharged from the sifting machine 12a.

Therefore, the embodiment of the present invention enables monitoring of the presence or absence of an abnormality in the respective flow paths b, e, h, k, m and o for the product flours discharged from the respective grinders 1a to 1c, the respective pulverizers 2a to 2c or the respective sifting machines 12a to 12c and 22a to 22c. In a case where it is determined that an abnormality is present as a result of monitoring, an operator can easily find out an abnormal spot.

Moreover, conventional milling facilities check the presence or absence of an abnormality in the facility based on yields obtained by measuring the weight when the wheat flours grouped into the first-class flour, the second-class flour, the third-class flour, and the like are conveyed to the next step by conveyors or the like. Thus, as an example, even in a case where the proportion of the product flours to be blended into the first-class flour is changed so that the first-class flour is changed in quality, an abnormality cannot be detected unless the total weight of the product flours to be blended is changed. With such a configuration, wheat flours of qualities different from a target are produced.

In contrast, the milling facility according to an embodiment of the present invention enables monitoring of the proportion of the respective product flours even in a case where the total weight of the product flours to be blended into the first-class flour is not changed, and thus enables an abnormality to be dealt with. Eventually, the milling facility according to an embodiment of the present invention enables wheat flours to be stabilized in quality.

Note that, on the display 31, not only the measurement values of the respective flow rates of product flours obtained by the respective flow rate measuring devices Q1 to Q6, but also time-series data on the measurement values of the respective flow rates can be displayed together with a graph. Alternatively, the display 31 can also indicate the graph in another window different from one indicating the measurement values or time-series data.

Moreover, the monitoring device 3 includes the comparison determiner 32. Thus, by monitoring the presence or absence of an abnormality based on a determination result of the comparison determiner 32, detection of an abnormality can be automated.

In a case where an abnormality is automatically detected based on the determination result of the comparison determiner 32, the operator can easily find out an abnormal spot if the flow path for product flour for which the abnormality has been detected is indicated and notified on the display 31. For example, in a case where an abnormality in the flow path b is detected based on the measurement value obtained by the flow rate measuring device Q1, the operator can easily find out an abnormal spot if the display "No. 1" or the display of the measurement value shall be changed to color display, inverted display, or the like for notification on the display 31 shown in FIG. 2.

Note that the monitoring device 3 can also include the comparison determiner 32 configured to respectively compare the measurement values of the respective flow rates of the product flours obtained by the respective flow rate measuring devices Q1 to Q6 in a time-series manner, and to determine the presence or absence of an abnormality.

Moreover, an abnormality, if automatically detected based on the determination result of the comparison determiner 32, can also be notified by turning on an alarm lamp provided on each of the flow paths b, e, h, k, m and o for the product flours discharged from the respective sifting machines 12a to 12c and 22a to 22c, as an example.

In the milling facility shown in FIG. 1, the monitoring device 3 includes the display 31 and the comparison determiner 32. However, the monitoring device 3 can also include only either the display 31 or the comparison determiner 32.

In the milling facility according to the above-mentioned embodiment of the present invention, the flow rate measuring devices Q1 to Q6 are provided on the respective flow paths b, e and h for the product flours discharged from the respective sifting machines 12a to 12c in the respective grinders 1a to 1c and the respective flow paths k, m and o for the product flours discharged from the respective sifting machines 22a to 22c in the respective pulverizers 2a to 2c. However, this embodiment is not a limitation, and flow rate measuring devices can also be provided for all of the flow paths a to i for wheat discharged from the respective sifting machines 12a to 12c and the flow paths j to o for wheat discharged from the respective sifting machines 22a to 22c.

In the milling facility according to the above-mentioned embodiment of the present invention, flow rate measuring devices may be provided on all of the flow paths a to i for wheat discharged from the respective sifting machines 12a to 12c and the flow paths j to o for wheat discharged from the respective sifting machines 22a to 22c. Such a configuration enables the flow rates in all of the flow paths a to o for wheat discharged from the respective sifting machines 12a to 12c and 22a to 22c to be visualized on the display 31.

Additionally, in the milling facility according to the above-mentioned embodiment of the present invention, flow rate measuring devices may be provided on all of the flow paths a to i for wheat discharged from the respective sifting machines 12a to 12c and the flow paths j to o for wheat discharged from the respective sifting machines 22a to 22c. Such a configuration enables monitoring of the presence or absence of an abnormality in all of the flow paths j to o for wheat discharged according to grain size from the respective grinders 1a to 1c, the respective pulverizers 2a to 2c, or the respective sifting machines 12a to 12c and 22a to 22c. In a case where it is detected that an abnormality is present as a result of monitoring, the operator can easily and detailedly find an abnormal spot.

In the above-mentioned embodiment of the present invention, a milling facility including the three grinders 1a to 1c and the three pulverizers 2a to 2c arranged downstream of the respective grinders 1a to 1c shown in FIG. 1 has been described as an example. However, such a configuration example is not a limitation, and the number of grinders and pulverizers, the number of tiers of sieves of each of the sifting machines, a conveyance destination of a material to be milled as classified by each of the sifting machines, and the like can be determined as appropriate.

The present invention is not limited to the above-described embodiment, but the configuration can be admittedly modified as appropriate without departing from the scope of the invention.

INDUSTRIAL APPLICABILITY

The present invention can be utilized as a mill monitoring system for a milling facility configured to mill crops such as wheat or another material to be milled.

RELATED APPLICATION

The entire disclosure of Japanese Patent Application No. 2019-72271, filed on Apr. 4, 2019, including the specification, claims, accompanying drawings and abstract of the disclosure is incorporated herein by reference in its entirety.

EXPLANATION OF REFERENCE NUMERALS

1*a* first grinder
1*b* second grinder
1*c* third grinder
11*a* roll mill (first brake roll)
11*b* roll mill (second brake roll)
11*c* roll mill (third brake roll)
12*a* first sifting machine
12*b* second sifting machine
12*c* third sifting machine
2*a* first pulverizer
2*b* second pulverizer
2*c* third pulverizer
21*a* roll mill (first smooth roll)
21*b* roll mill (second smooth roll)
21*c* roll mill (third smooth roll)
22*a* fourth sifting machine
22*b* fifth sifting machine
22*c* sixth sifting machine
3 monitoring device
31 display
32 comparison determiner
Q1-Q6 flow rate measuring device (flowmeter)
a-o flow path

The invention claimed is:

1. A monitoring system for a milling facility, wherein the milling facility includes:
a plurality of grinders configured by combining roll mills for grinding a material to be milled and sifting machines for sifting out, according to grain size, the material to be milled as ground by the roll mills; and
a plurality of pulverizers configured by combining roll mills for pulverizing the material to be milled and sifting machines for sifting out, according to grain size, the material to be milled as pulverized by the roll mills, and
the material to be milled, being a raw material, is gradually milled by each of the grinders and each of the pulverizers, and product flours are discharged from the respective sifting machines in the respective grinders and the respective pulverizers and blended at a predetermined proportion to produce a classed flour having a predetermined quality and grade, the monitoring system configured to blend the predetermined proportion of the product flours comprising:
a plurality of flow rate measuring devices provided on respective flow paths for product flours discharged from the respective sifting machines in the respective grinders and the respective pulverizers; and
a monitoring device capable of monitoring presence or absence of an abnormality, wherein
the monitoring device is capable of monitoring the presence or absence of an abnormality by changing the predetermined proportion of the product flours to produce the classed flour based on measurement results on respective flow rates of the product flours obtained by the respective flow rate measuring devices.

2. The monitoring system for the milling facility according to claim 1, wherein
the monitoring device has a display configured to display the measurement results of respective flow rates of the product flours obtained by the respective flow rate measuring devices, and
the monitoring system is capable of monitoring the presence or absence of an abnormality based on the measurement results of the respective flow rates of the product flours displayed on the display.

3. The monitoring system for the milling facility according to claim 2, wherein
the monitoring device has a comparison determiner configured to respectively compare measurement values of the respective flow rates of the product flours obtained by the respective flow rate measuring devices with a reference value set in advance, and to determine the presence or absence of an abnormality, and
the monitoring system is capable of monitoring the presence or absence of an abnormality based on a determination result obtained by the comparison determiner.

4. The monitoring system for the milling facility according to claim 2, wherein
the monitoring device has a comparison determiner configured to respectively compare measurement values of the respective flow rates of the product flours obtained by the respective flow rate measuring devices in a time-series manner, and to determine the presence or absence of an abnormality, and
the monitoring system is capable of monitoring the presence or absence of an abnormality based on a determination result obtained by the comparison determiner.

5. The monitoring system for the milling facility according to claim 1, wherein
the monitoring device has a comparison determiner configured to respectively compare measurement values of the respective flow rates of the product flours obtained by the respective flow rate measuring devices with a reference value set in advance, and to determine the presence or absence of an abnormality, and
the monitoring system is capable of monitoring the presence or absence of an abnormality based on a determination result obtained by the comparison determiner.

6. The monitoring system for the milling facility according to claim 1, wherein
the monitoring device has a comparison determiner configured to respectively compare measurement values of the respective flow rates of the product flours obtained by the respective flow rate measuring devices in a time-series manner, and to determine the presence or absence of an abnormality, and
the monitoring system is capable of monitoring the presence or absence of an abnormality based on a determination result obtained by the comparison determiner.

7. A monitoring system for a milling facility, wherein the milling facility includes:
a plurality of grinders configured by combining roll mills for grinding a material to be milled and sifting machines for sifting out, according to grain size, the material to be milled as ground by the roll mills; and
a plurality of pulverizers configured by combining roll mills for pulverizing the material to be milled and sifting machines for sifting out, according to grain size, the material to be milled as pulverized by the roll mills, and
the material to be milled, being a raw material, is gradually milled by each of the grinders and each of the pulverizers, and product flours are discharged from the respective sifting machines in the respective grinders and the respective pulverizers and blended at a predetermined proportion to produce a classed flour having a predetermined quality and grade, the monitoring system configured to blend the predetermined proportion of the product flours comprising:

a plurality of flow rate measuring devices provided on respective flow paths for materials to be milled as discharged according to grain size from the respective sifting machines in the respective grinders and the respective pulverizers; and a monitoring device capable of monitoring presence or absence of an abnormality, wherein the monitoring device is capable of monitoring the presence or absence of an abnormality by changing the predetermined proportion of the product flours to produce the classed flour based on measurement results on respective flow rates of the respective materials to be milled as obtained by the respective flow rate measuring devices.

* * * * *